United States Patent Office 2,955,074
Patented Oct. 4, 1960

2,955,074

HEAT STERILIZATION OF IRON-BINDING GLOBULIN AND ADDING RADIOACTIVE IRON THERETO

John H. Hink, Jr., Berkeley, Calif., assignor to Cutter Laboratories, Berkeley, Calif., a corporation of California No Drawing. Filed Apr. 13, 1953, Ser. No. 348,590

2 Claims. (Cl. 167—74)

This invention relates to and in general has for its object the provision of means of destroying any virus, particularly the virus of homologous serum jaundice, which may be present as a contaminant in iron-binding globulin obtained from human or animal plasma.

The iron-binding globulin (also referred to as the $B_1$-metal-combining protein or siderophyllin or transferrin) is characterized electrophoretically as a $B_1$-globulin. It is low in bound lipide content, has a sedimentation constant in the ultra-centrifuge of $S_{20}$, $W=5.0$, and has a molecular weight of approximately 90,000. A method for its isolation from human plasma has been reported by Surgenor et al., J. Am. Chem. Soc. 71, 1223–1229 (1949).

The complete physiological role of the iron-binding globulin has not yet been elucidated, but it is possible that the iron-binding globulin has an important potential clinical usefulness. It is known to function in the transport of iron by the blood to the hematopoietic tissues. Since free iron in the human body is extremely toxic, the iron-binding globulin also serves to pick up and bind any iron accidently set free, such as by hemolytic reactions. The most important physiological use for the iron-binding globulin at the present time is as a carrier for the injection of iron, or of iron isotopes, in the study of iron metabolism. In these studies, which are performed largely on humans, it is absolutely essential to insure that the human volunteers are not infected with the virus of homologous serum jaundice or with other pathological viruses.

Presently there are two ways of destroying the jaundice virus in blood plasma or in solutions of plasma proteins; one is by ultraviolet irradiation and the other is by heat. Ultraviolet irradiation does not measurably harm the iron-binding globulin and does not measurably impair its iron-binding capacity. However, recent and more critical studies on the irradiation of icterogenic plasma have cast great doubts on the effectiveness of any practical degree of ultraviolet irradiation in destroying the homologous serum jaundice virus in plasma or in solutions of plasma proteins. The adverse data concerning ultraviolet irradiation is as yet unpublished but is well known to those proficient in the field.

In 1948, Gellis et al., J. Clin., Invest., 27, 239 (1948), reported that the homologous serum jaundice virus was destroyed in human serum albumin by subjecting the albumin solution to a heat treatment of 60° C. for 10 hours. The work of Gellis et al. has been fully verified and confirmed in recent years, even though the testing is difficult because the human is the only host known to be susceptible to the virus of homologous serum jaundice.

More specifically then the primary object of this invention is to provide a means of treating the purified iron-binding globulin so that it will withstand a heat treatment of 60° C. for 10 hours without becoming denatured and without loss of its iron-binding activity.

I discovered, quite unexpectedly, that if the iron-binding globulin is first saturated with iron, that is, if it is made to contain approximately 1.0 to 1.2 milligrams of iron per gram of the protein, a solution of the iron saturated iron-binding globulin would withstand a temperature of 60° C. for 10 hours with no observable change, whereas if an untreated iron-binding globulin is so heated, it denatures and even precipitates from solution.

Since iron-binding globulin already saturated with iron is of no value for the administration of special iron isotopes bound to the protein, I then had to devise processes for removing the iron from the iron-binding globulin after the stabilization and virus sterilization has been effected. The process for stabilization with iron and the process for removal of iron are adequately described in the following examples.

Purified $B_1$-metal combining globulin is dissolved as a 10 percent solution in distilled water. The pH is adjusted to 6.8–7.5 with 1 N sodium hydroxide. Ferrous ammonium sulfate or any other approximately neutral ferrous or ferric salt is dissolved in the protein solution to a concentration of 0.9–1.2 mg. iron per gram of protein. The solution changes from a yellow to a deep red color upon addition of the iron salt, indicating protein iron-binding. The clear red solution is then heated to 60° C. for 10 hours to assure the destruction of any virus which may be present. (Most viruses are destroyed much more easily than the virus of homologous serum jaundice.) The iron may then be removed from the protein by any of the following methods:

(1) Disodium ethylene bisiminodiacetate (a chelating agent) is added to give a concentration of three moles of chelating agent per mole of iron. The pH is then decreased to 3.8–4.2 by the addition of 3 M acetic acid. The increase in hydrogen ion concentration decreases the binding forces between the protein and the iron and increases the binding forces between the chelating agent and the iron. Consequently, the iron gradually transfers from the protein to the chelating agent and the solution changes from red to yellow indicating a reversal of the protein-iron complex.

The iron chelate is now removed from the protein solution either by ion exchange with a strong anion exchange resin (for example, IRA 400 manufactured by Rohm and Haas, or Duolite A–40, manufactured by the Chemical Process Co.), or by dialysis against distilled water. The latter method is the least desirable alternative because a large quantity of the chelating agent remains bound to the protein and must, in turn, be removed by ion exchange using a strong anion exchange resin with the protein-chelating agent solution adjusted to a pH value between 3.8–6.5.

(2) The iron-protein solution can be adjusted to a pH of 3.8–4.2 by the addition of dilute acetic acid. The color of the solution will change from red to yellow. The acidified solution is then passed through a strong cation exchange resin (for example, IR 120 manufactured by Rohm & Haas, or Duolite C–20 manufactured by the Chemical Process Co.) to remove the iron. This method is not as efficient as the previously described methods.

(3) Much of the iron can be removed by complexing the iron with triethylene tetramine and removing the iron-triethylene tetramine complex on a strong cation exchange resin. This method of iron removal is also less efficient than the method described in Example 1.

If desired, the final solution of iron-binding globulin free of iron and chelating agent and free of virus can be dried by conventional freeze-drying methods, or by the solvent-drying method described in my Patent No. 2,659,986 of Nov. 24, 1953.

I have consistently found the iron-binding capacity of the iron-free $B_1$-metal combining protein heat-pasteurized by the above process to be essentially the same as the iron-binding capacity of a non-heat-treated $B_1$-metal combining protein. The heat-treated protein is also readily soluble in water to form a stable 25 percent protein solution at neutral pH values.

When an aqueous solution of native iron-binding globulin unsaturated with iron is heated at 60° C. for only a few hours, a complete loss of iron-binding capacity occurs and the protein is denatured to a point where it is only slightly soluble in water. The degree of iron saturation of the iron-binding globulin is very critical when the protein is to be subjected to virus sterilization. When the protein contains less than 0.9 mg. iron per gram of protein and is subjected to the viricidal heat treatment, the reduction of its subsequent iron-binding capacity is proportional to the reduction in its iron content. When the protein contains more than 1.2 mg. iron per gram of protein and is subjected to the viricidal heat treatment, the reduction of its subsequent iron-binding capacity is almost proportional to the increase in its iron content.

The heat treatment of 60° C. for 10 hours, commonly accepted as adequate for destruction of all viruses, is not necessarily the minimum amount of heat which will destroy the virus of homologous serum jaundice. It is the minimum amount of heat which has thus far been adequately demonstrated to destroy the virus of homologous serum jaundice. Progress toward demonstrating the effectiveness of lower degrees of heat is slow because the presence of this particular virus can be demonstrated only by infecting human volunteers, and the infection is sometimes fatal. For this reason, I do not wish my discovery to be limited to the application of any precise amount of heat, but rather to the process of stabilizing the iron-binding globulin with certain amounts of iron during the heat-destruction of virus. The iron-binding globulin, as isolated from human plasma, naturally contains less than 0.8 mg. iron per gram of globulin.

As far as I am aware, this is the first time that any labile biologically-active protein has been stabilized to heat by combination with a heavy metal. Although I have long suspected that certain blood proteins are rendered more stable in the presence of trace amounts of certain metals, the above disclosure is an example of a labile protein being stabilized to a useful degree by combination with a specific heavy metal. When it is desired to administer tagged iron, such as Fe57, in the study of iron metabolism in humans, the use of the heat pasteurized virus-free iron-binding globulin as a vehicle for the tagged iron has been found useful in many clinical experiments.

Having thus described my invention, what I claim and desire to secure by Letters Patent is:

1. The process of stabilizing purified iron-binding globulin, fractionated from human plasma, against the adverse effects of heat sterilization, comprising: adding a soluble iron salt to a solution of the purified iron-binding globulin in the proportion of from 0.8 to 1.3 mg. of iron per gram of globulin, and heating the solution of iron-containing, iron-binding globulin to the extent sufficient to destroy the virus of homologous serum jaundice or other pathogenic viruses which may contaminate said globulin, without impairing said globulin.

2. In the process of preparing a purified iron-binding globulin free of the virus of homologous serum jaundice and other pathogenic viruses and containing a radioactive isotope of iron, the step of stabilizing the globulin fraction to subsequent heat sterilization by adding a soluble iron salt to a solution of said globulin until said globulin contains from 0.8 mg. to 1.3 mg. iron per gram of globulin, heating said solution of iron-containing, iron-binding globulin to an extent sufficient to destroy said viruses, removing an appreciable amount of the iron from said iron-containing, iron-binding globulin and adding a radioactive isotope of iron to the virus-free, undenatured, iron-binding globulin, without impairing said globulin.

References Cited in the file of this patent

Horvath: Am. J. of Pharmacy, July 1943, pp. 256–20.
Chem. and Eng. News, May 26, 1952, vol. 30, No. 21, pp. 2218, 2222.
Surgenor et al.: J.A.C.S., July 5, 1952, vol. 74, pp. 3448–9.
Surgenor et al.: J. Clin. Inv., pp. 73–78, 1949.
Rath et al.: J. Clin. Inv., pp. 79–85, 1949.